(12) United States Patent
Gagnon

(10) Patent No.: US 8,867,598 B1
(45) Date of Patent: Oct. 21, 2014

(54) TIMING AND DATA RECOVERY IN FEED-FORWARD EQUALIZATION

(75) Inventor: Mathieu Gagnon, Verdun (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 109 days.

(21) Appl. No.: 13/585,409

(22) Filed: Aug. 14, 2012

(51) Int. Cl.
*H03K 5/159* (2006.01)
*H03H 7/30* (2006.01)
*H03H 7/40* (2006.01)

(52) U.S. Cl.
USPC ............ 375/229; 375/230; 375/232; 375/233; 375/316

(58) Field of Classification Search
USPC ............ 375/229, 232, 233, 316, 230
See application file for complete search history.

(56) References Cited

U.S. PATENT DOCUMENTS

| | | | |
|---|---|---|---|
| 3,697,689 A | 10/1972 | Gibson | |
| 4,669,092 A | 5/1987 | Sari et al. | |
| 4,805,191 A | 2/1989 | Burch et al. | |
| 4,815,103 A | 3/1989 | Cupo et al. | |
| 5,285,482 A | 2/1994 | Sehier et al. | |
| 5,353,312 A | 10/1994 | Cupo et al. | |
| 5,481,195 A | 1/1996 | Meyer | |
| 5,675,612 A | 10/1997 | Solve et al. | |
| 5,790,606 A * | 8/1998 | Dent | 375/348 |
| 5,838,744 A | 11/1998 | Zheng | |
| 6,414,990 B1 | 7/2002 | Jonsson et al. | |
| 6,529,549 B1 | 3/2003 | Norrell et al. | |
| 6,650,699 B1 | 11/2003 | Tierno | |
| 6,922,440 B2 | 7/2005 | Yu et al. | |
| 6,975,676 B1 | 12/2005 | Goodson et al. | |
| 6,985,549 B1 | 1/2006 | Boracree et al. | |
| 7,050,523 B2 | 5/2006 | Chen et al. | |
| 7,190,718 B2 | 3/2007 | Bui et al. | |
| 7,280,614 B2 | 10/2007 | Brossier et al. | |
| 7,489,749 B2 | 2/2009 | Liu | |
| 7,599,433 B2 | 10/2009 | Zhu et al. | |
| 7,817,712 B2 * | 10/2010 | Hidaka | 375/230 |
| 7,995,648 B2 | 8/2011 | Xia et al. | |
| 8,199,529 B2 * | 6/2012 | Schaible et al. | 363/17 |

* cited by examiner

*Primary Examiner* — Ted Wang
(74) *Attorney, Agent, or Firm* — Dennis R. Haszko

(57) ABSTRACT

An equalizer is disclosed, and associated operational method. The equalizer has a configuration that balances performance and complexity by obtaining samples that are strongly correlated with future and past transmitted bits, and are weakly correlated with future and past bit transitions, and is useful for timing recovery circuits. Samples are only obtained or collected at time intervals more than one sample period away from the reference sample. Samples are shifted by a delay value less than the sample period, and are obtained at a sample period of one unit interval. A means to adjust the sampling point delay is also disclosed. In an implementation, samples that are within the sample period away from the reference sample are obtained and used for implementing a timing shift, not for equalization of the timing recovery signal. Embodiments are also disclosed for optimizing performance for data recovery.

21 Claims, 10 Drawing Sheets

US 8,867,598 B1

TIMING AND DATA RECOVERY IN FEED-FORWARD EQUALIZATION

FIELD

The present disclosure relates generally to digital telecommunications. More particularly, the present disclosure relates to clock recovery in digital telecommunications.

BACKGROUND

Digital communications often require timing information to be extracted from a data stream. This data stream is subject to the degradation of the communication channel medium. Since the timing information is shared with the data, it is subject to inter-symbol interference (ISI). This ISI requires specific filtering to optimize the timing recovery performance, such as described in U.S. Pat. No. 6,975,676.

Many different filter structures have been used to correct for this timing ISI. A general example diagram of such a system is shown in FIG. 1A where an input signal 104 is sampled by sampler 102, using an eye-edge-synchronized reference 106, and by sampler 112, using an eye-center-synchronized reference 116. The output of these samplers goes through an eye edge equalizer 103 and an eye center equalizer 105, respectively. The equalized samples 107 and 109 are used by the timing recovery circuit to adjust the phase of a reference clock 111 to generate the eye-edge-synchronized reference 106 and eye-center-synchronized reference 116.

However, the known structures have not been optimized for the specific characteristics of the timing recovery. Different coding techniques lead to different clock extraction methods.

Feed-Forward Equalizers (FFEs) have been used for filtering. The usual structure is to use future and past samples taken at integer multiples of the unit interval time (T) of the data stream, weight them according to the filter coefficients and sum them together, as shown in the FFE 10 in FIG. 1B. Future samples, also referred to as pre-cursors, refer to samples coming before the current sample being corrected. They require the current sample to be delayed before it is processed, in order for these future samples to be captured. Past samples are also referred to as post-cursors.

Fractional FFEs also exist that additionally sample the data stream at fractions of the unit interval (UI), for example twice per UI (sampling at T/2). The performance of the filter generally improves as the length of the filter increases, however with diminishing returns. While using fractional FFEs can be beneficial, the number samples required to cover a comparable filter depth increases in proportion to the increased sampling rate. Furthermore, using fractional FFEs requires more input samplers and more reference clock generation, which increases complexity.

It is, therefore, desirable to provide a filter configuration that balances performance and complexity.

BRIEF DESCRIPTION OF THE DRAWINGS

Embodiments of the present disclosure will now be described, by way of example only, with reference to the attached Figures.

DETAILED DESCRIPTION

Figure 1A:
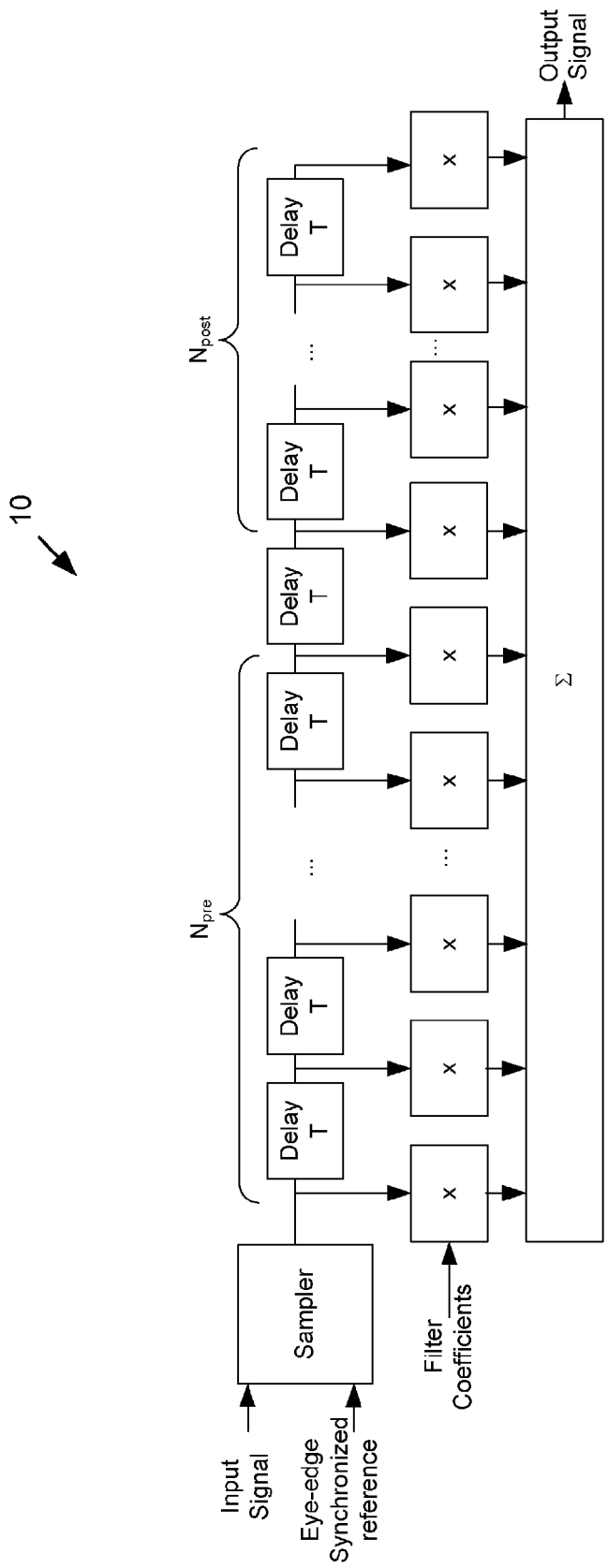
FIG. 1A illustrates a general timing recovery circuit.
Figure 1B:
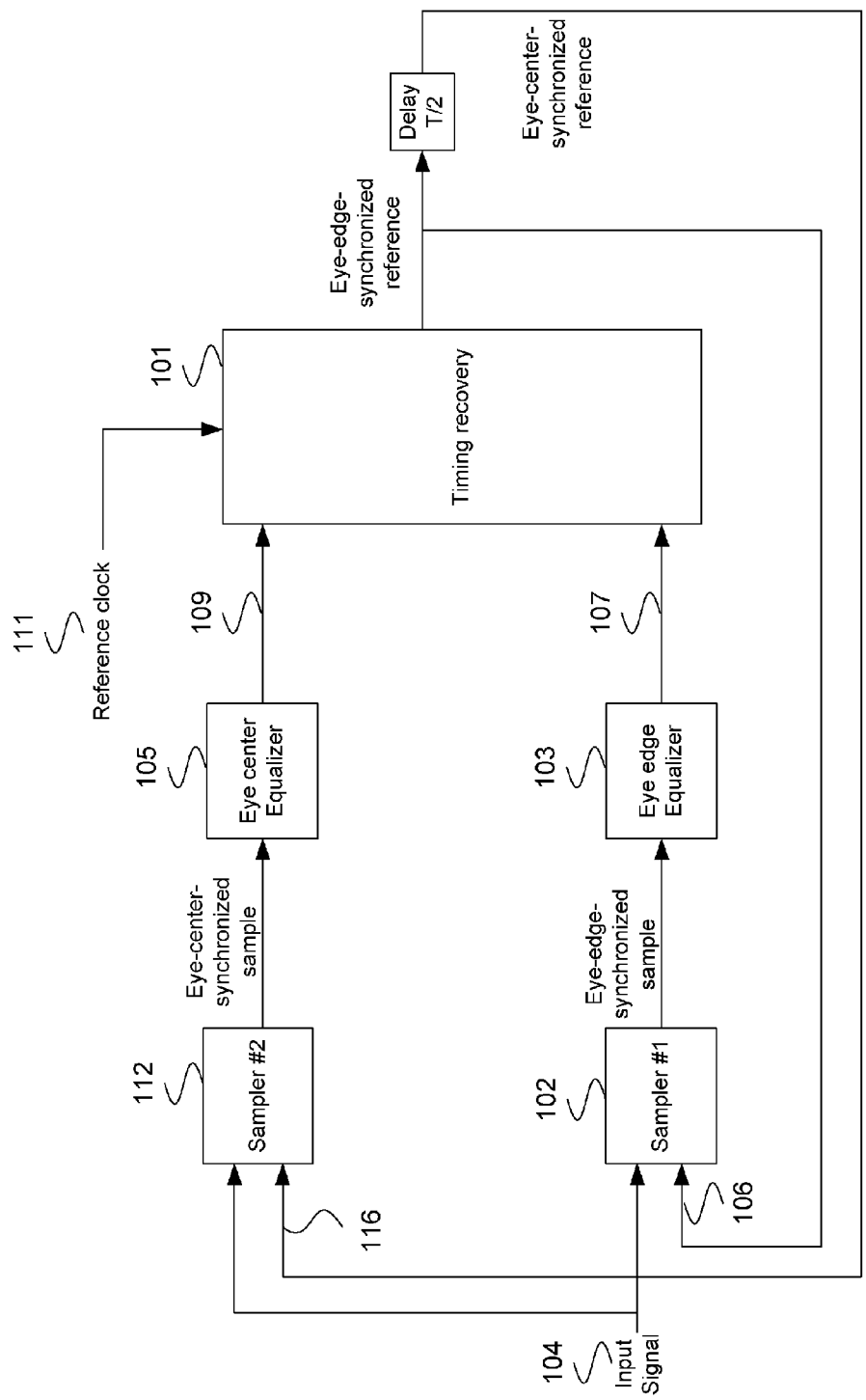
FIG. 1B illustrates a known feed forward equalizer filter.

Generally, the present disclosure provides an equalizer for timing recovery, and associated operational method. The equalizer has a configuration that balances performance and complexity by obtaining samples that are strongly correlated with future and past transmitted bits, and are weakly correlated with future and past bit transitions. Timing recovery samples are only obtained or collected at time intervals more than one sample period away from the reference sample. Timing recovery samples are shifted by a delay value less than the sample period, and the samples are obtained at a sample period of one unit interval. A means to adjust the sampling point delay is also disclosed. In an implementation, samples that are within the sum of the delay value and the sample period away from the reference sample are obtained and used for implementing a timing shift, not for timing recovery. Embodiments are also disclosed for providing data recovery instead of, or in addition to, timing recovery.

In an embodiment, the present disclosure provides an equalizer comprising: obtaining a reference sample of an input signal, the reference sample having a reference sample value; obtaining a set of shifted input signal samples at a sample period of one unit interval, the samples being shifted by a delay value, the delay value being less than the sample period, the obtained samples being strongly correlated with future and past transmitted bits and being weakly correlated with future and past bit transitions; multiplying each element of said set of samples by a filter coefficient weight to create a set of compensation values; and generating an output as a sum of the compensation values and the reference sample value. The equalizer can be used, for example, for timing recovery.

In an example embodiment, obtaining the set of shifted input samples that are strongly correlated with future and past transmitted bits comprises only obtaining the samples at time instants that are more than the sample period away from the reference sample, for example such that samples are not obtained at time instants that are less than the sample period away from the reference sample In an example embodiment, the first reference sample of the input signal is taken at instant t; the set of shifted input samples are taken at instants t+p+nT, where p represents the delay value, which is a fixed timing shift in the range ]0,T[, where T is the period of a data symbol, and where n is an integer and spans a range of values set by the desired filter length, but excludes values −1 and 0.

In an example embodiment, the delay value is a fixed value, such as T/2. In another example embodiment, the delay value is variable and is set to: optimize a performance criterion; minimize the sum of squares of equalizer coefficients, for example FFE coefficients; or minimize the sum of squares of the difference between the output signal and an ideally equalized input signal, which is commonly referred to as an error signal.

In an example embodiment, the method further comprises: obtaining a second set of samples at the sample period of one unit interval, the samples being shifted by the delay value; multiplying the second set of samples with a second set of filter coefficients to create a second set of compensation values; adding the sum of the second set of compensation values to the output; and adjusting the second set of filter coefficients to produce a desired timing point delay.

In an embodiment, the present disclosure provides an equalizer comprising first and second signal samplers and a multiplier circuit. The first signal sampler is configured to obtain a reference sample of an input signal, the reference sample having a reference sample value. The second signal sampler is configured to obtain a set of shifted input signal samples at a sample period of one unit interval, the samples being shifted by a delay value, the delay value being less than the sample period, the obtained samples being strongly correlated with future and past transmitted bits and being weakly correlated with future and past bit transitions. The multiplier circuit is configured to multiply each element of said set of samples by a filter coefficient weight to create a set of compensation values, and to generate an output as a sum of the compensation values and the reference sample value. In an embodiment, the reference sample value can be multiplied by a main filter coefficient.

In an example embodiment, the second signal sampler is configured to only obtain the samples at time instants that are more than the sample period away from the reference sample.

In an example embodiment, the first signal sampler is configured to produce signal samples at instants $t_0+nT$, where $t_0$ is an initial time reference, n is an integer and T is a symbol period corresponding to the sample period; and the second signal sampler is configured to produce signal samples at instants $t_0+nT+p$, where p is a constant in the range $]0, T[$.

In an example embodiment, the timing recovery circuit further comprises: a non-transitory machine-readable readable medium storing a set of filter coefficients including a main filter coefficient; and a summing element having one input for each filter coefficient element and producing the output signal. In this case, the multiplier circuit comprises: a) a first multiplying element having: i) a first input connected to the main filter coefficient; ii) a second input connected to the sample from the first signal sampler; iii) an output connected to one of the inputs of the summing element; and b) a set of multiplying elements, each having: i) a first input connected to one of the filter coefficients; ii) a second input connected to one of the stored samples from the second signal sampler, the stored samples being selected according to the filter length, but omitting samples $t_0+nT+p$ and $t_0+(n-1)T+p$, when processing the sample from the first sampler taken at instant $t_0+nT$; and iii) an output connected to one of the inputs of the summing element.

In an example embodiment, the first and second signal samplers are implemented as analog-to-digital converters; and the summing element, the non-transitory machine readable medium, the first multiplying element and the set of multiplying elements are implemented using digital circuits.

In an example embodiment, the summing element comprises two supplemental inputs, and the timing recovery circuit further comprises: two supplemental coefficients set to obtain a desired timing instant variation; and two further multiplying elements, each having: i) a first input connected to the stored samples from the second sampler corresponding to samples at instant $t_0+nT+p$ and $t_0+(n-1)T+p$, when processing the sample from the first sampler taken at instant $t_0+nT$; ii) a second input connected to one of each of said supplemental coefficients; and iii) an output connected to one of each of said supplemental summing node inputs.

In an embodiment, the present disclosure provides a data equalization circuit comprising first and second signal samplers, and a multiplier circuit. The first signal sampler is configured to obtain a reference sample of an input signal, the reference sample having a reference sample value, and to produce signal samples at instants $t_0+nT$, where $t_0$ is an initial time reference, n is an integer and T is a symbol period corresponding to the sample period. The second signal sampler is configured to obtain a set of shifted input signal samples at a sample period of one unit interval, the samples being shifted by a delay value, the delay value being less than the sample period, the obtained samples being strongly correlated with future and past transmitted bits and being weakly correlated with future and past bit transitions, the second signal sampler being configured to produce signal samples at instants $t_0+nT+p$, where p is a constant in the range $]0, T[$, such as T/2. The multiplier circuit is configured to multiply each element of said set of samples by a filter coefficient weight to create a set of compensation values, and to generate an output as a sum of the compensation values and the reference sample value.

In an embodiment, the present disclosure provides a combined data and timing recovery equalization circuit comprising: a. a first signal sampler producing a signal sample at instants $t_0+nT$, where $t_0$ is an initial time reference synchronized close to the edge of each unit interval (UI), n is an integer and T is a symbol period; b. a second signal sampler producing a signal sample at instants $t_0+nT+T/2$; c. a set of filter coefficients; d. means to store the samples from the first and second signal samplers; e. a first summing element having one input for each filter coefficient element and producing a timing recovery output signal; f. a first multiplying element having: i. a first input connected to the main filter coefficient for timing recovery; ii. a second input connected to a main sample from the first signal sampler; iii. an output connected to one of the inputs of said first summing element for timing recovery; g. a first set of multiplying elements, each having: i. a first input connected to one of said filter coefficients; ii. second input connected to one of the stored samples from the second signal samplers, the stored samples being selected according to the filter length, with samples $t_0+nT+T/2$ and $t_0+(n-1)T+T/2$ being ignored when processing the sample from the first sampler taken at instant $t_0+nT$; iii. an output connected to one of the inputs of said summing element; h. a second summing element having one input for each filter coefficient element and producing a data recovery output signal; i. a second multiplying element having; i. a first input connected to the main filter coefficient for data recovery; ii. a second input connected to a main sample from the second signal sampler; iii. an output connected to one of the inputs of said second summing element for data recovery; j. a second set of multiplying elements, each having: i. a first input connected to one of said filter coefficients; ii. a second input connected to one of the stored samples from the first signal samplers, the stored samples being selected according to the filter length, with samples $t_0+(n+1)T$ and $t_0+nT$ being ignored, when processing the sample from the first sampler taken at instant $t_0+nT+T/2$; iii. an output connected to one of the inputs of said second summing element for data recovery.

In an example embodiment, the first and second signal samplers are implemented as analog-to-digital converters; and the summing element, the non-transitory machine readable medium, the first and second multiplying elements and the first and second sets of multiplying elements are implemented using digital circuits.

In an example embodiment, the summing element comprises two supplemental inputs, and the circuit further comprises: two supplemental coefficients set to obtain a desired timing instant variation; and two further multiplying elements, each having: i. a first input connected to the stored samples from the second sampler corresponding to samples at instant $t_0+nT+T/2$ and $t_0+(n-1)T+T/2$, when processing the sample from the first sampler taken at instant $t_0+nT$; ii. a second input connected to one of each of said supplemental coefficients; iii. an output connected to one of each of said supplemental first summing node inputs.

In an embodiment, the present disclosure provides an equalization method to use for timing recovery circuits, comprising: obtaining a reference sample of an input signal having a clock that is synchronized with the eye edge, the reference sample having a reference sample value; obtaining a set of shifted input signal samples at a sample period of one unit interval, the samples being shifted by a delay value, the delay value being less than the sample period, the obtained samples being strongly correlated with future and past transmitted bits and being weakly correlated with future and past bit transitions; multiplying each element of said set of samples by a filter coefficient weight to create a set of compensation values; and generating an output as a sum of the compensation values and the reference sample value.

In an example embodiment, the input samples are shifted with respect to an eye-center-aligned timing reference. In another embodiment, the input samples are shifted with respect to an eye-edge-aligned timing reference.

Other aspects and features of the present disclosure will become apparent to those ordinarily skilled in the art upon review of the following description of specific embodiments in conjunction with the accompanying figures.

With telecommunication systems having increasingly higher data rates, optimization of performance is desirable to maintain transmission reliability over long reaches. Timing recovery variations due to ISI, or due to sub-optimal sampling points, lead to performance reduction, and thus reduction of rate and/or reach attainable by a system.

Embodiments of the present disclosure are based upon the non-obvious observation of where the desired input information for a feed-forward equalizer is most correlated with the input signal to said equalizer. It is also different from previous configurations, in particular fractional FFEs, which sample faster than baud rate (e.g. T/2). When compared to fractional FFEs, embodiments of the present disclosure only use a subset of the samplers, for example those that are not at k*T, but only those at k*T/2, and even then omit the first two samplers used in a fractional FFE. When compared to a non-fractional FFE, embodiments of the present disclosure have a sampling instant shift of value p, for example p=T/2, and holes around the reference. In an embodiment, the first two samples around the reference are not used for ISI compensation, but are rather adjusted independently for timing point control.

Embodiments of the present disclosure will be described below primarily in relation to protocols that rely upon average zero crossing points to extract the timing information, such as Non-Return to Zero (NRZ) data encoding. In other embodiments of the present disclosure, different encoding schemes are used, as such embodiments are not limited to NRZ encoding.

Existing FFE structures have sub-optimal performance/complexity ratios for equalizing timing recovery circuits. For timing recovery equalization, the ISI at the crossing point has to be minimized. For an NRZ system, that corresponds to reducing the jitter at the edges of the eye, rather than in the center as for data equalization.

A known unit interval (UI) spaced FFE uses samples that are spaced at multiples of 1 UI from the point where the compensation is applied. For data equalization, this means that points are sampled in the center of the eye of future and past UIs. This is very well correlated with the digital data that is the source of the ISI, i.e. the future and past bits being transmitted.

However, for timing recovery, this equalizer structure collects information around points where transitions between preceding bits and transitions between succeeding bits are expected to occur. This results in poor correlation between the sampled correction data and the ISI source that is to be compensated.

Furthermore, since the sampled data is close to the bits just preceding and/or succeeding the bit transition being equalized, this results in a constant time shift when the filter is optimized. This is because bits just before and just after a bit transition are fully correlated with this bit transition: if it is a falling transition, the preceding bit is a digital one and the succeeding one is a digital zero, and vice-versa for a rising transition. This means that compensation strongly correlated with these bits will tend to shift the post-equalized bit transition always in the same direction, as it will apply an equal but opposite compensation for rising than for falling edges.

A clock recovery shift is however sometimes desirable, as the timing point that optimizes jitter tolerance may be different than that extracted from the average zero crossing of a data stream. This is because the jitter distribution around the average zero crossing point may not be symmetrical. According to an example embodiment of the present disclosure, the data sampling point is set half a UI away from the median zero-crossing timing point (center between extremes), rather than half a UI away from the mean. This can help improve or optimize jitter tolerance.

At least one embodiment of the present disclosure provides an equalizer that provides enhanced timing recovery equalization. At least one embodiment of the present disclosure provides a means to control the timing point shift. At least one embodiment of the present disclosure provides a means to compensate duty-cycle distortion (DCD).

Many timing recovery techniques exist. One of the most popular is the Gardner detector, which sets the timing reference point as the average zero-crossing point of the bit stream, relative to a 1-bit-UI timing reference. Other techniques can lead to slightly different timing reference points; however, practical solutions will result in a reference point close to this one. The data is usually sampled in the center of the eye, which is about half a UI away from this timing reference point. Timing recovery equalization thus aims at reducing ISI around this timing reference point.

The linear response of a pulse train to a pulse response is computed by convolving a train of either positive or negative 1-bit-interval-spaced Dirac functions, representing the digital input data, with the pulse response. According to an embodiment of the present disclosure, in cases in which equalizing the signal at the instants of transition between bits is desired, the input train can be split in two: 1) the bits just preceding and just succeeding a bit transition, and 2) the other bits of the data stream.

Without lack of generality, it can be assumed that the bit transition being equalized is a falling edge; linear systems will respond with the same shape but inverted sign to a rising edge, thus the conclusions reached can be directly applied to this case through elementary mathematical manipulations, as will be evident to one of ordinary skill in the art.

For a falling edge, the transmitted bit just prior to the bit transition being equalized will be a digital one, while the bit just after the bit transition being equalized will be a digital zero. According to an embodiment of the present disclosure, the response of the system is then split in two: the response to just the two bits causing the transition being equalized; and the response to the other bits. The input bit stream is accordingly split in two: a first set comprising the Dirac function just after the transition and the Dirac function just before the transition; and a second set comprising the other Dirac functions. The first set can be referred to as a set of transition bits; the second set can be referred to as a set of non-transition bits. The total response of the system is the sum of the responses to these two sets of Dirac functions.

The convolution of an FFE filter with the first set of Dirac functions (representing the transition bits) results in a constant response, since the input is fixed for a given transition type (rising or falling). This constant response means that a constant voltage offset will be added to a timing reference point. For the opposite transition type, a voltage offset of equal magnitude but opposite polarity is added. This voltage offset is converted into a timing offset by finding the moment at which the response to the first set of Dirac functions would cross zero given this offset. Since the sign of this voltage offset tracks the type of the transition, it always results in a constant average timing offset.

The response to the second set of Dirac functions is what really causes ISI at the reference timing point. Thus, an equalizer should optimize the response from this set of Dirac functions at the reference timing point.

FFEs use samples of the input data, which they convolve with their equalization filter. These equalization filters can be represented by a set of Dirac functions with amplitudes proportional to the FFE filter coefficients.

In digital systems, the input waveform is constrained to a certain format. The information conveyed is that of the digital bit stream; however, when looking at a continuous signal (or analog form) waveform, each of these bits of information is spread out in time, due to the nature of the digital encoding, and to the spread of the energy through the channel. Even though this continuous waveform carries the same digital information, this information is convolved with the response of the channel, which spreads the information according to the channel's response.

The equalizer filter, when optimized for the current channel, contains the opposite of the channel response. The missing information to compensate for ISI is that of the original data stream.

Common 1-UI spaced FFE filters collect samples at integer multiples of 1-UI away from the point to be compensated, in this case the reference timing point for each UI. This corresponds to the common discrete convolution of Equation 1.

$$Y(n) = \sum_k X(n-k) \cdot F(k) \quad \text{Equation 1}$$

$$X(n) = x(t_0 + n \cdot T)$$

where:

Y(n) represents the output at the timing reference point of UI n

X(n) represents the input at the timing reference point of UI n

F(k) represents the FFE filter coefficients x(t) represents the continuous waveform input to the equalizer $t_0$ represents the reference timing point T represents the bit period (UI duration)

F(0) multiplies the input at the reference timing point and can be set to 1, so as to normalize the FFE coefficients. F(−1) and F(1) will multiply samples of the signal taken at instants that are strongly correlated with the bits just after and just before the bit transition being equalized, respectively. As explained above, this will introduce a constant reference point timing shift.

In general, this filter will sample at an integer multiple of a UI away from the timing reference point of the bit transition being equalized. These points correspond to the timing reference points of other bits (i.e., instant of bit transitions). Thus, the information collected at those points will not be strongly correlated with the input data stream.

Embodiments of the present disclosure use a different equalizer structure to better correlate the input data stream with the samples. In an example embodiment, improved or optimal correlations with the future and past bits are found at points that are shifted less than one UI with respect to the reference timing point, ignoring or omitting the points within one UI of the reference timing point. In an example embodiment, the improved correlations are found about half a UI away from the reference timing point, that is, in the center of the eye, again ignoring or omitting the points within one UI of the reference timing point.

In an embodiment, the structure of the filter to improve the equalizer behavior follows Equation 2.

$$Y(n) = \sum_k X_c(n-k) \cdot F(k) \quad k \neq \{-1, 0\} \quad \text{Equation 2}$$

$$X_c(n) = x(t_0 + n \cdot T + p)$$

In Equation 2, p represents an extra positive timing point shift so as to sample where the input data is most correlated with the information of the digital data stream. In an example embodiment, the value of the timing point shift, or delay value, p, is less than the bit period or sample period T.

In an embodiment of the present disclosure, a timing recovery feed forward equalizer filter does not contain or obtain the two coefficients that would sample the digital information most correlated with the bits just before and after the bit transition being equalized, as these bits are not very useful to compensate ISI.

Figure 2A:
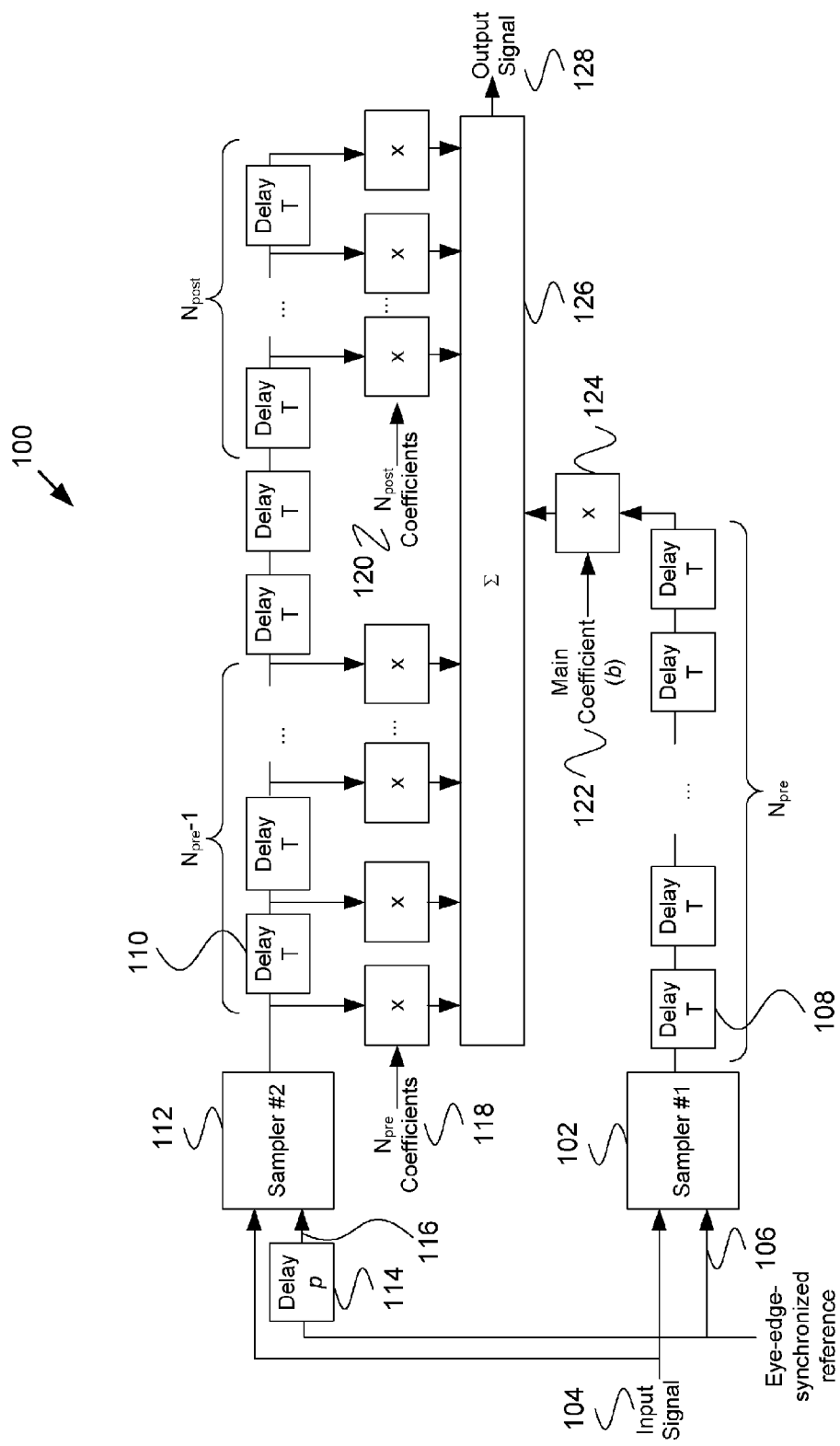
FIG. 2A illustrates a feed forward equalizer according to an embodiment of the present disclosure.

FIG. 2A illustrates an equalizer 100 according to an embodiment of the present disclosure. In this example embodiment, a first sampler 102 (Sampler #1) receives an input signal 104 and a sampling time reference 106, the sampling time reference 106 being synchronous to the edge of the received bits (edge of the eye). The first sampler 102 produces an output that is connected to a chain 108 of $N_{pre}$ delay elements.

A second sampler 112 (Sampler #2) receives the same input signal 104 and a sampling time reference 116 delayed by delay p through a delay element 114. The output of the sampler 112 is connected to a chain 110 of $N_{post}+N_{pre}+1$ delay elements, so as to generate $N_{post}+N_{pre}+2$ delayed samples. The first $N_{pre}$ samples are connected to corresponding $N_{pre}$ multiplier elements, each of them multiplying the delayed sample by a specific $N_{pre}$ filter coefficient 118. The last $N_{post}$ samples are connected to corresponding $N_{post}$ multiplier elements, each of them multiplying the delayed sample by a specific $N_{post}$ filter coefficient 120. The two delayed samples generated after the delay elements $N_{pre}$ and $N_{pre}+1$ are not used. The output of the delay chain 108 is multiplied by a Main Filter Coefficient 122, or main timing filter coefficient, in a multiplier element 124, and connected to one input of a summing node 126. The summing node 126 generates the output signal 128 as the sum of all its inputs, the output signal 128 relating to timing recovery.

Figure 2B:
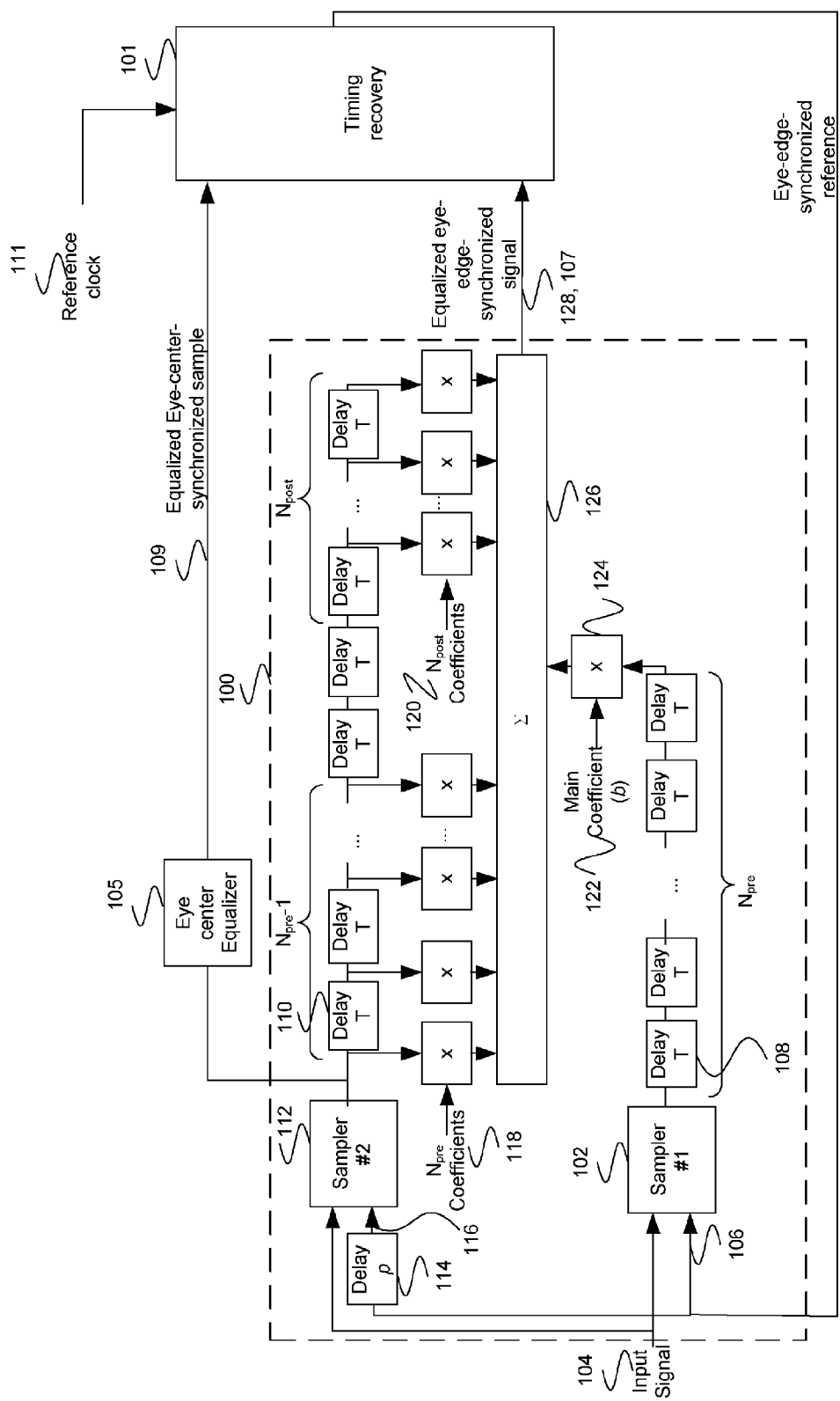
FIG. 2B illustrates a usage of an embodiment of the present disclosure.

FIG. 2B illustrates a usage of the embodiment of the present disclosure. The output signal is used as the eye-edge-synchronized sample provided as input to the timing recovery circuit. The equalizer 100 of FIG. 2B serves as the eye edge equalizer 103 of FIG. 1A.

Figure 3:
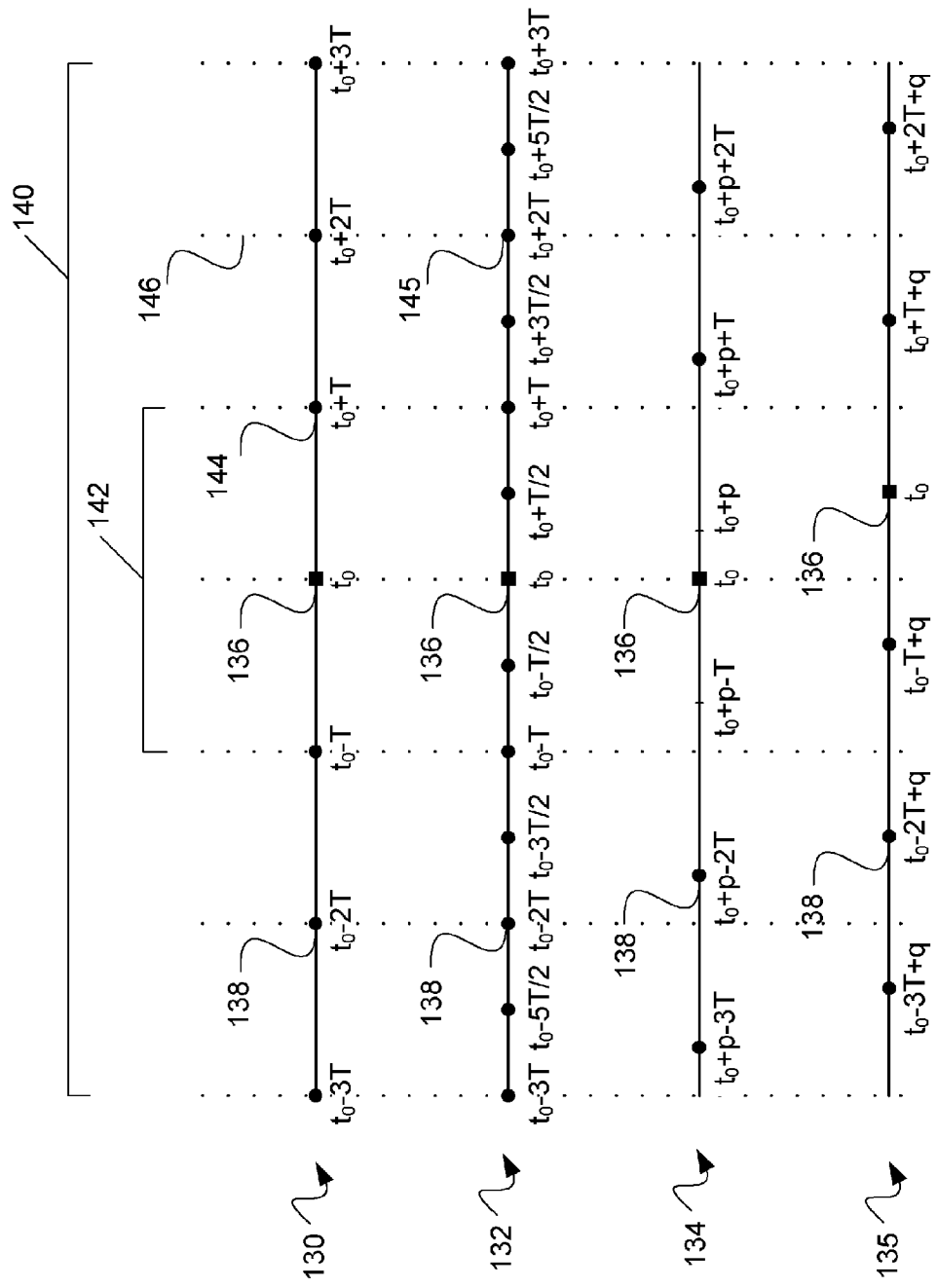
FIG. 3 illustrates a timing diagram comparing sampling according to a known feed forward equalizer, a known fractional feed forward equalizer, and feed forward equalizers according to a embodiments of the present disclosure.

FIG. 3 illustrates timing plots comparing sampling of known approaches to a embodiments of the present disclosure. Timing plots 130 and 132 illustrate sampling performed by a known feed forward equalizer, and a known fractional feed forward equalizer, respectively. Timing plots 134 and 135 illustrate sampling performed by a feed forward equalizer according to embodiments of the present disclosure.

In FIG. 3, each of the timing plots shows a reference sample, 136, represented by a small square on the timeline, and a plurality of input signal samples 138, represented by circles on the timeline. In FIG. 3, an exemplary time period 140 of 6 UIs is shown. Samples taken within a timing window 142 are also identified, corresponding to time instants within ±1 UI of the reference sampling point 136, since these samples are found to be correlated with future and past bit transitions, according to embodiments of the present disclosure for which the reference sample point is aligned with the edge of the eye. Samples taken outside of the timing window 142 but within the exemplary time period 140 are found to be strongly correlated with future and past transmitted bits, according to embodiments of the present disclosure. Dashed lines 146 represent the instants around which bit transitions occur.

The FFE timing plot 130 shows six (6) samples being taken within the time period 140, in addition to the reference sample. Sampling occurs at a sampling period of T, which corresponds to the bit period. Two of the six samples in the FFE timing plot 130 are taken within the timing window 142 in which samples are correlated with future and past bit transitions, which is undesirable from a timing recovery perspective. Other samples, such as sample 144, are taken at instants 146 that correspond to transitions between bits.

The fractional FFE timing plot 132 shows twelve (12) samples being taken within the time period 140. Sampling occurs at a sampling period of T/2, which corresponds to two samples within each bit period. Two of the twelve samples in the fractional FFE timing plot 132 are taken within the timing window 142 in which samples are correlated with future and past bit transitions, which is undesirable from a timing recovery perspective. Half of the other samples (for example, sample 145) are taken at instants 146 that correspond to transitions between bits, and thus carry less information about future and past bits. Moreover, the increased number of taps adds cost to this approach.

The timing plot 134 according to an embodiment of the present disclosure shows four (4) samples being taken within the time period 140. Sampling occurs at a sampling period of T, which corresponds to the bit period. None of the four samples in the timing plot 134 are taken within the timing window 142, meaning that all four samples are strongly correlated with future and past transmitted bits and are weakly correlated with future and past bit transitions. In an example embodiment, the samples that are strongly correlated are not totally correlated with future/past UI nor totally uncorrelated with future/past transitions: they are simply more correlated with UIs than they are with transitions.

The timing plot of FIG. 3 illustrates how an embodiment of the present disclosure provides a solution that improves or optimizes timing recovery performance with a given number of taps, since it omits samples that are most strongly correlated with the future and past bit transitions, and it also omits samples correlated with the bits creating the bit transition being equalized. The omitted samples contain the least information useful for correcting for the linear distortion caused by future and past bits.

In FIG. 3, the timing plot 134 shows the input samples being shifted with respect to the bit period T by a delay value p. This corresponds to example embodiments that are most useful for timing sample equalization. In an embodiment, the delay value is less than the bit period or sample period T. In an example embodiment, the delay value is a fixed timing shift in the range ]0,T[.

In one example embodiment, the delay value is p=T/2. In this example embodiment, though some samples are taken at the same time as samples taken in the fractional FFE approach that samples at T/2, this example embodiment obtains much fewer samples and omits the samples correlated with the bit transition being equalized, resulting in better performance and a lower cost, and less power consumption. Embodiments of the present disclosure select the best samples to take for a given number of taps.

In FIG. 3, the timing plot 135 shows the input samples referenced to the center of the eye, and being shifted with respect to the bit period T by a delay value q. This corresponds to example embodiments that are most useful for data sample equalization.

Figure 4:
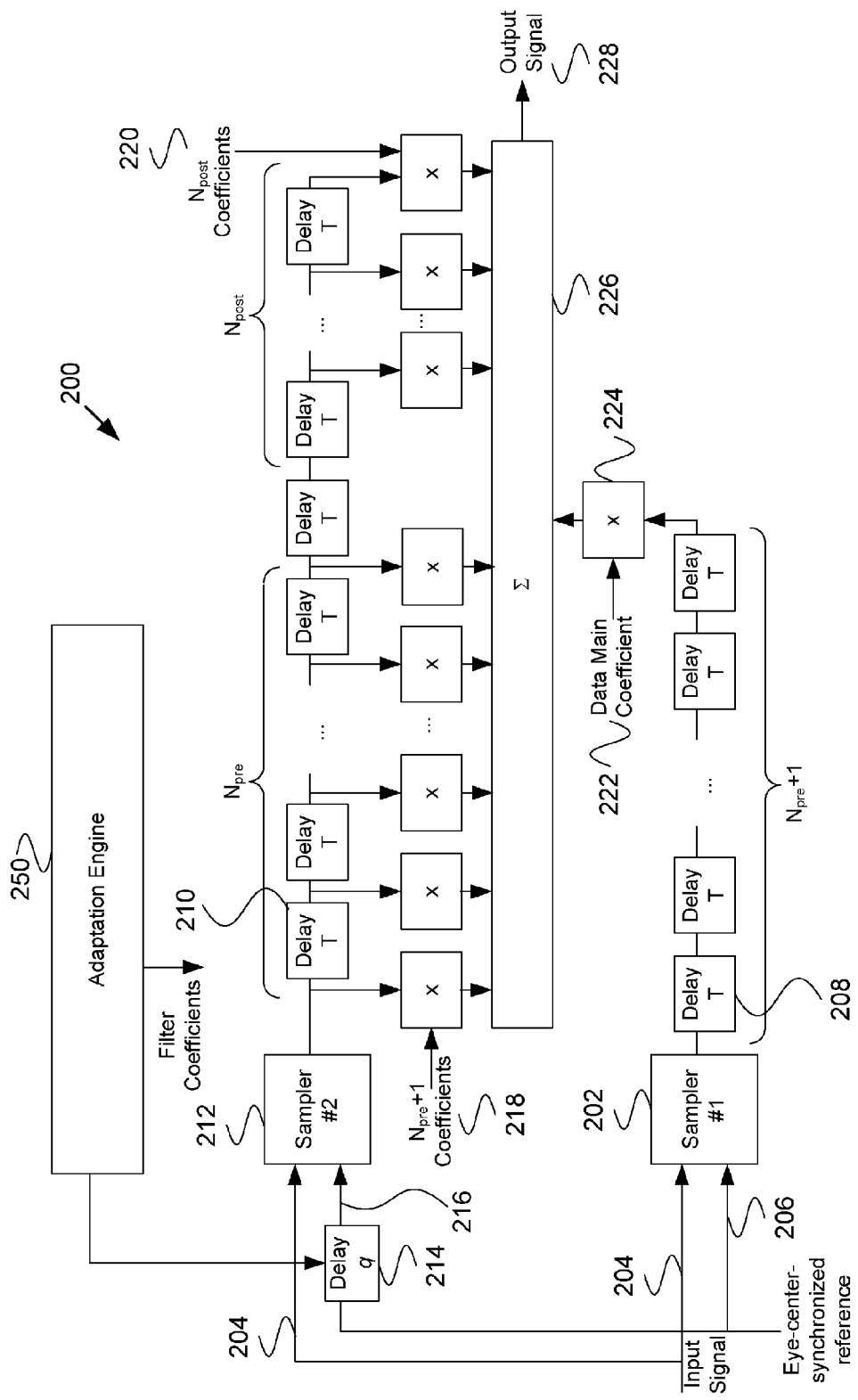
FIG. 4 illustrates an equalizer according to an embodiment of the present disclosure, including jitter equalization for data recovery.

FIG. 4 illustrates an equalizer 200 according to an embodiment of the present disclosure, including jitter equalization for data recovery. While embodiments of the present disclosure have thus far been described with respect to timing recovery, jitter optimization can also be applied to the stream going to data recovery. In some embodiments of the present disclosure, Sampler #1 is aligned with the center of the eye, and Sampler #2 is delayed to provide an optimal sampling time for past and future transmitted bits. The reference numerals in FIG. 4 in the 200 series are parallel to those in FIG. 2A using the 100 series, for example 206 is similar to 106.

The equalizer 200 of FIG. 4 includes adaptation of delay p 114 from FIG. 2A into a delay value q 214. This example embodiment can be referred to as a delay optimizer. In this example embodiment, an adaptation engine 250 provides a variable delay value, which is preferably an optimized delay value q. In this case, the fixed delay time p 114 of the embodiment of FIG. 2A is replaced by a variable delay q 214, controlled through the adaptation engine 250. In an example embodiment, the value of the variable delay q 214 is chosen as to minimize the final error after the filter coefficients are optimized. Delay q has values in the range ]−T/2, T/2[. Negative delays result in embodiments where either: additional 1-UI delay (i.e., T) is added after Sampler #1, and delay q is increased to q'=q+T; or Sampler #1 is delayed by −q, and Sampler #2 is not delayed.

In the embodiment of FIG. 4, a difference when compared with the embodiment of FIG. 2A is that a timing reference 206 is aligned with the center of the eye, as shown in FIG. 4, rather than the timing reference 106 of FIG. 2A which is aligned with the edge of the eye. In an example data recovery embodiment, an optimal equalization change delay is used, however the timing shift is not applied, as this loop does not control timing. The output signal in this embodiment is an output signal 228 to data recovery.

Also, in FIG. 4, the delay chain 208 includes $N_{pre}+1$ delay blocks, rather than $N_{pre}$ delay blocks in FIG. 2A, and element 222 is a data main coefficient. In FIG. 4, only one delayed sample generated after the delay elements $N_{pre}$ and $N_{pre}+1$ are not used, as opposed to two such elements in FIG. 2A. The delay chain 210 in FIG. 4 includes $N_{pre}$ delay elements with $N_{pre}+1$ coefficients, and $N_{post}$ delay elements with $N_{post}$ coefficients FIG. 5 includes another example embodiment of a feed forward equalizer including adaptation of delay, but this time using an eye-edge synchronized reference. In the example embodiment of FIG. 5, the adaptation engine, or equalization engine, 150 receives as inputs the outputs of samplers 102 and 112 (samplers #1 and #2), as well as an error signal. The output signal 128 of the summing node 126 is provided, along with an ideal signal 154, as an input to a subtractor block 152, which outputs the error signal that is provided to the adaptation engine 150. In an example embodiment, the ideal signal 154 is derived from the output signal 128. The adaptation engine 150 outputs filter coefficients, which are the same (pre and post cursors) as the other filter coefficients in FIG. 5. Similar to FIG. 2A, the chain 108 in FIG. 5 includes $N_{pre}$ delay elements, as compared to the $N_{pre}+1$ elements in chain 208 of FIG. 4.

Figure 6:
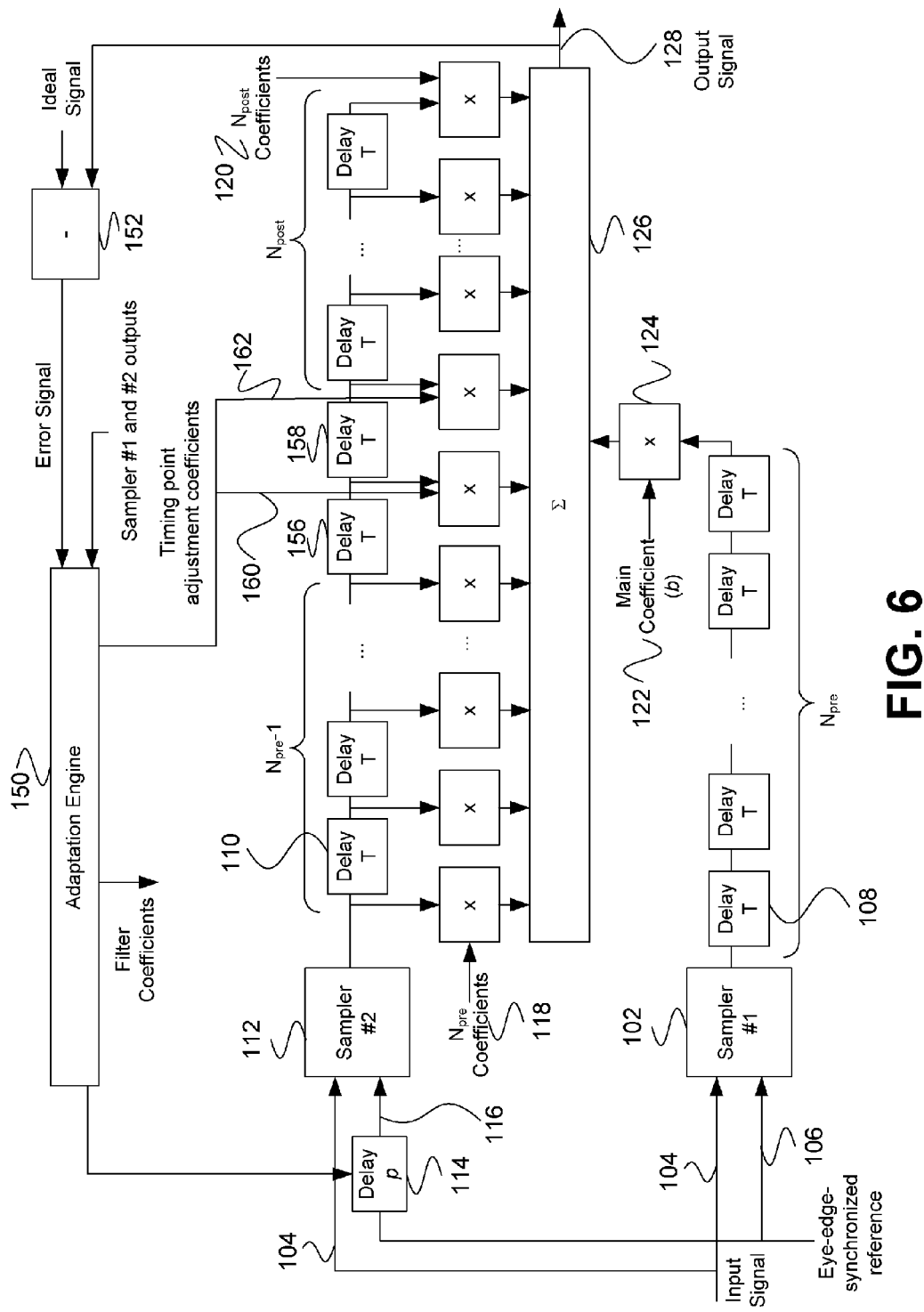
FIG. 6 illustrates an equalizer according to an embodiment of the present disclosure, including control of the sampling instant.

FIG. 6 illustrates an equalizer according to an embodiment of the present disclosure, including control of the sampling instant. It is sometimes desirable to slightly move the sampling instant relative to the nominal reference timing point. In such a scenario, in an embodiment the filter structure includes these extra coefficients, but they are controlled in a different way. For example, their value is not set to reduce ISI, but rather to provide a desired sampling instant shift, as shown in Equation 3.

$$Y(n) = \sum_k X_c(n-k) \cdot F(k) + \sum_{m=\{-1,0\}} X_c(n-m) \cdot G(m) \quad k \neq \{-1, 0\}$$

$$X_c(n) = x(t_0 + n \cdot T + p)$$

Equation 3

In Equation 3, G(m) represents the FFE filter optimized to provide the desired timing point shift p, through the effect of G(m) on Y(n), according to the timing recovery method used.

According to various embodiments, in both Equations 2 and 3, the parameter p can either be fixed or variable. When variable, it can be selected or optimized to find the best location for the filter. Various metrics can be used to evaluate this optimal point, in particular minimizing the sum of the squares of the final equalizer coefficients (F).

A method according to another embodiment involves computing an error signal, which is the difference between the output of the filter and an ideal output. The optimal delay minimizes the sum of the squares of the error signal.

The example embodiment shown in FIG. 6 makes use of the two delayed samples 156 and 158 in the middle of the chain, which are the samples taken at $t_0+p$ and $t_0+p-T$, where $t_0$ represents the sampling of the main coefficient through sampler 102 (Sampler #1). These are the two samples that are omitted or not obtained in the embodiment of FIG. 2A. In the example embodiment of FIG. 6, these samples are multiplied by coefficients 160 and 162, which are selected or optimized to find an improved timing instant. The values of coefficients 160 and 162 are not set as the other filter coefficients, but using an independent control circuit that controls, and preferably optimizes, the effective timing shift that these coefficients produce. In an example embodiment, the timing instant is selected to reduce a specific error criterion, which can be on the timing equalization, on the data recovery, or both.

Further details on certain aspects of such an adaptation scheme can be found in the following patents, each of which is incorporated herein by reference: U.S. Pat. No. 6,650,699; U.S. Pat. No. 6,529,549; U.S. Pat. No. 5,675,612; U.S. Pat. No. 7,280,614; U.S. Pat. No. 7,599,433; U.S. Pat. No. 7,995,648; U.S. Pat. No. 6,414,990; and U.S. Pat. No. 4,669,092. In these example cases, a timing adjustment signal representing a desired delay, or a direction towards an optimal delay, is computed.

According to an embodiment of the present disclosure, existing adaptation methods are modified, to further convert the timing adjustment signal into filter coefficients. In an example embodiment, this is done by determining the direction of the timing shift generated by a unit change of the filter coefficients.

Figure 7:
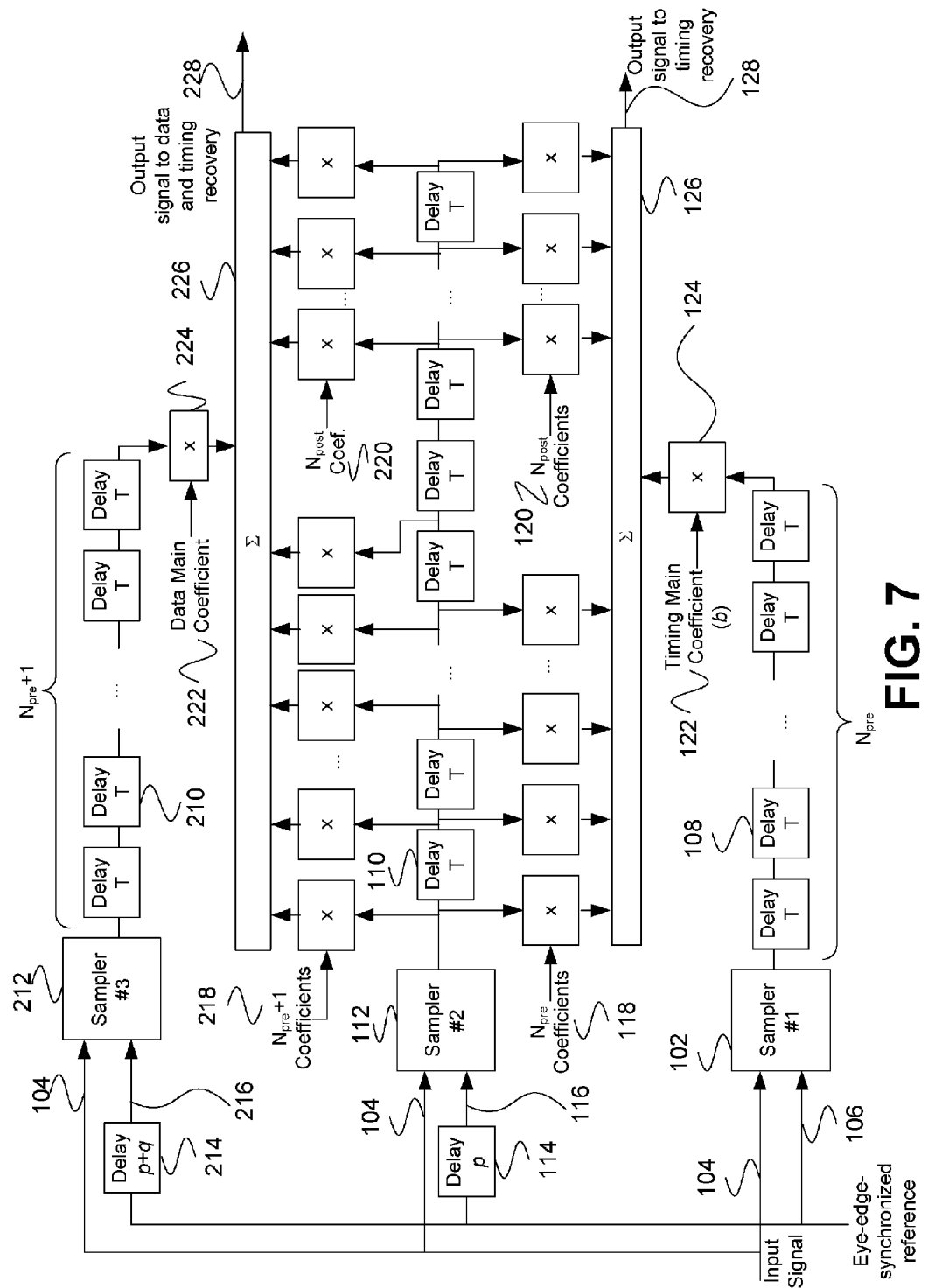
FIG. 7 illustrates an equalizer according to an embodiment of the present disclosure, including combined data and timing equalization.

FIG. 7 illustrates an equalizer according to an embodiment of the present disclosure, including combined data and timing equalization. In an embodiment, the combined data and timing equalization includes circuits from both FIG. 4 and FIG. 5, with the re-use of the delay blocks 110 and the Sampler #2 112.

Figure 5:
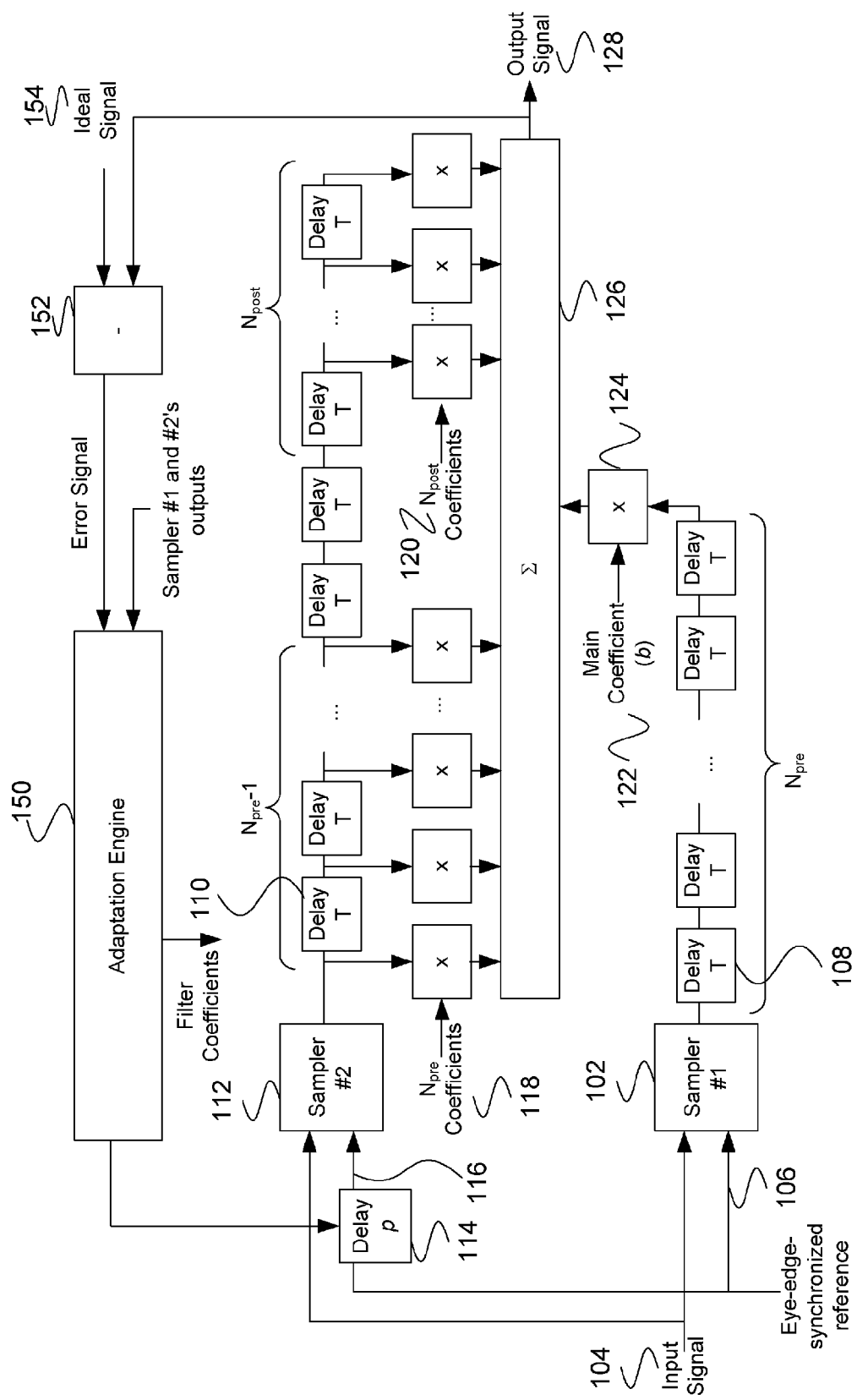
FIG. 5 illustrates an equalizer according to an embodiment of the present disclosure, including adaptation of delay p.

In an example embodiment, such as shown in FIG. 7, a jitter-optimized equalizer includes the circuits from FIG. 5, and reuses the delay chain 110 connected to sampler 102 to equalize the recovered data, possibly extending it. Those skilled in the art will recognize that if the delay is half a UI (i.e., T/2), the two delay chains can be merged and used for both equalizers (data and timing), resulting in a smaller implementation. In this example implementation (delay=T/2), the delay chain attached to Sampler #1 in FIG. 5 is the same as the first $N_{pre}$ delay elements attached to Sampler #2 in FIG. 4 and the two can thus be merged, assuming the eye-center-synchronized reference arrives half a UI after the edge-center-synchronized reference. Furthermore, the delay chain attached to Sampler #1 in FIG. 4 is one UI earlier than the first $N_{pre}$ delay elements attached to Sampler #2 in FIG. 5, and most of them can be merged. The output signals to timing recovery and to data recovery 128 and 228, respectively, are shown.

Figure 8:
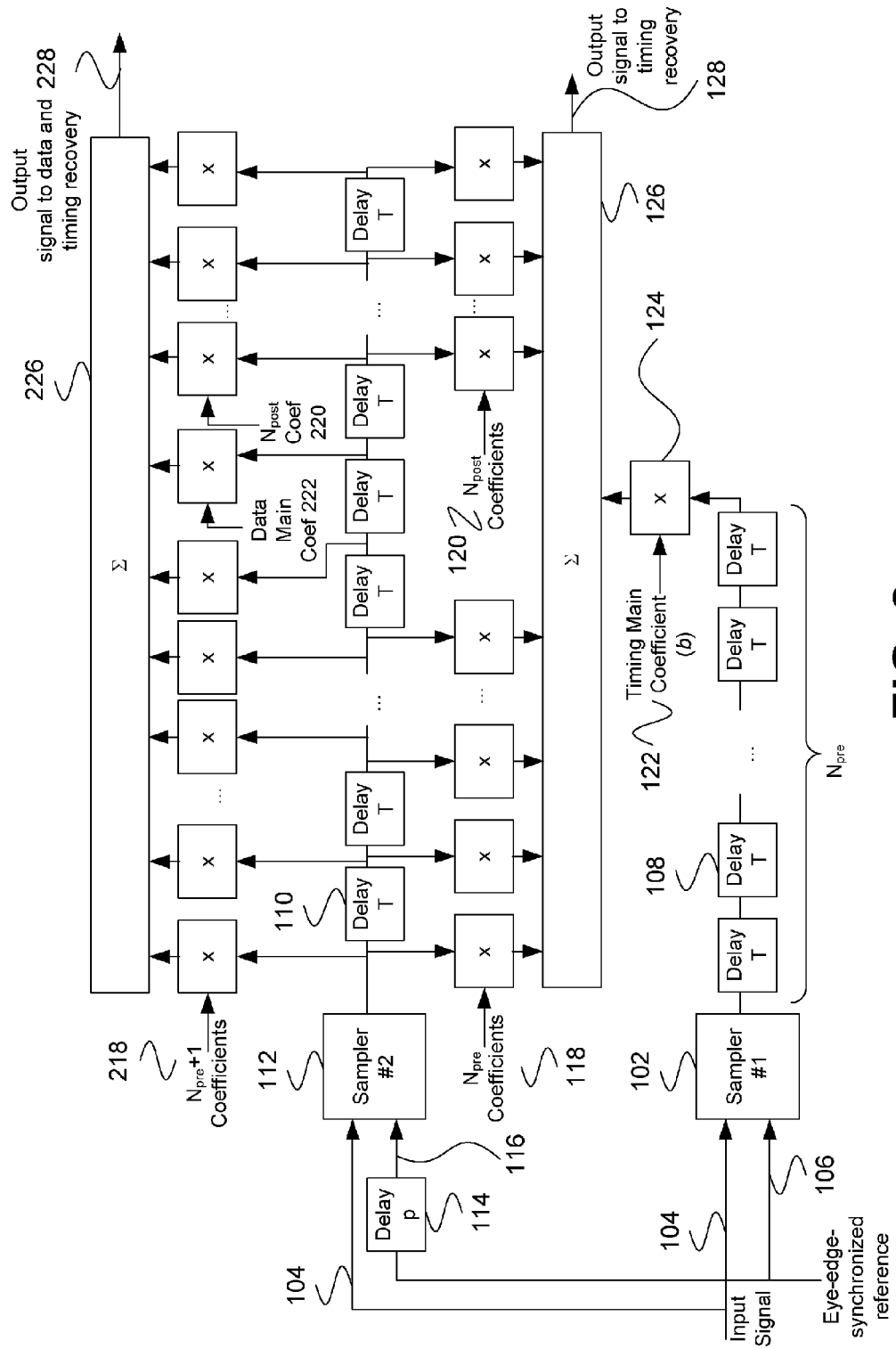
FIG. 8 illustrates an equalizer according to another embodiment of the present disclosure, including combined data and timing equalization.

FIG. 8 illustrates an equalizer according to another embodiment of the present disclosure, including combined data and timing equalization. While FIG. 7 illustrates the general case of combined data and timing equalization, FIG. 8 illustrates the particular case in which the delay q is zero. In this case, the two delay chains 110 and 210 of FIG. 7 are merged into delay chain 110 in FIG. 8. Similarly, the Sampler #2 112 and Sampler #3 212 from FIG. 7 are merged into Sampler #2 112 in FIG. 8.

Embodiments of the present disclosure provide a new filtering structure to improve the equalization of timing recovery circuits. According to an example embodiment of the present disclosure, timing equalization is performed by an FFE that is spaced at ±1+p+N, for example at ±1.5+N. Embodiments of the present disclosure provide one or more of the following: reduced magnitude of the FFE coefficients, since compensation input is better correlated with the original bit value, which can also reduce noise amplification and keep timing recovery gain more constant; reduced remaining error; increased timing recovery gain—thus jitter tolerance; reduced sampling point shift during adaptation. In some cases, embodiments of the present disclosure take advantage of the fact that data samplers (e.g., 112) have a higher precision than timing samplers (e.g., 102); thus, re-using the data samplers for the timing point equalization results in a better performance.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. An equalization method, comprising:
   obtaining, by an equalizer, a reference sample of an input signal, the reference sample having a reference sample value;
   obtaining, by the equalizer, a set of shifted input signal samples at a sample period of one unit interval, the samples being shifted by a delay value, the delay value being less than the sample period, the obtained samples being strongly correlated with future and past transmitted bits and being weakly correlated with future and past bit transitions;
   multiplying, by the equalizer, each element of said set of samples by a filter coefficient weight to create a set of compensation values; and
   generating, by the equalizer, an output as a sum of the compensation values and the reference sample value.

2. The method of claim 1 wherein the set of shifted input samples are shifted with respect to an eye-center-aligned timing reference.

3. The method of claim 1 wherein the set of shifted input samples are shifted with respect to an eye-edge-aligned timing reference.

4. The method of claim 1 wherein obtaining the set of shifted input samples that are strongly correlated with future and past transmitted bits comprises only obtaining the samples at time instants that are more than the sample period away from the reference sample.

5. The method of claim 1 wherein:
   the first reference sample of the input signal is taken at instant t, and
   the set of shifted input samples are taken at instants $t+p+nT$,
   where p represents the delay value, which is a fixed timing shift in the range $]0, T[$,
   where T is the period of a data symbol, and
   where n is an integer and spans a range of values set by the desired filter length, but excludes values −1 and 0.

6. The method of claim 1 wherein the delay value is a fixed value.

7. The method of claim 1 wherein the delay value is $T/2$.

8. The method of claim 1 wherein the delay value is variable and is set to optimize a performance criterion.

9. The method of claim 1 wherein the delay value is variable and is set to minimize the sum of squares of FFE coefficients.

10. The method of claim 1 wherein the delay value is variable and is set to minimize the sum of squares of the difference between the output signal and a ideally equalized input signal.

11. The method of claim 1 further comprising:
    obtaining, by the equalizer, a second set of samples at the sample period of one unit interval, the samples being shifted by the delay value;
    multiplying, by the equalizer, the second set of samples with a second set of filter coefficients to create a second set of compensation values;
    adding, by the equalizer, the sum of the second set of compensation values to the output; and
    adjusting, by the equalizer, the second set of filter coefficients to produce a desired timing point delay.

12. An equalization circuit comprising:
    a first signal sampler configured to obtain a reference sample of an input signal, the reference sample having a reference sample value;
    a second signal sampler configured to obtain a set of shifted input signal samples at a sample period of one unit interval, the samples being shifted by a delay value, the delay value being less than the sample period, the obtained samples being strongly correlated with future and past transmitted bits and being weakly correlated with future and past bit transitions; and
    a multiplier circuit configured to multiply each element of said set of samples by a filter coefficient weight to create a set of compensation values, and to generate an output as a sum of the compensation values and the reference sample value.

13. The equalization circuit of claim 12 wherein the second signal sampler is configured to only obtain the samples at time instants that are more than the sample period away from the reference sample.

14. The equalization circuit of claim 12 wherein:
    the first signal sampler is configured to produce signal samples at instants $t_0+nT$,
    where t0 is an initial time reference, n is an integer and T is a symbol period corresponding to the sample period; and
    the second signal sampler is configured to produce signal samples at instants $t_0+nT+p$,
    where p is a constant in the range $]0, T[$.

15. The equalization circuit of claim 12 further comprising:
    a non-transitory machine-readable readable medium storing a set of filter coefficients including a main filter coefficient; and a summing element having one input for each filter coefficient element and producing the output signal;
wherein the multiplier circuit comprises:
a) a first multiplying element having:
   i) a first input connected to the main filter coefficient;
   ii) a second input connected to the sample from the first signal sampler;
   iii) an output connected to one of the inputs of the summing element;
b) a set of multiplying elements, each having:
   i) a first input connected to one of the filter coefficients;
   ii) a second input connected to one of the stored samples from the second signal sampler, the stored samples being selected according to the filter length, but omitting samples $t_0+nT+p$ and $t_0+(n-1)T+p$, when processing the sample from the first sampler taken at instant $t_0+nT$; and
   iii) an output connected to one of the inputs of the summing element.

16. The equalization circuit of claim 15 wherein:
the first and second signal samplers are implemented as analog-to-digital converters; and
the summing element, the non-transitory machine readable medium, the first multiplying element and the set of multiplying elements are implemented using digital circuits.

17. The equalization circuit of claim 12 wherein the summing element comprises two supplemental inputs, and further comprising:
two supplemental coefficients set to obtain a desired timing instant variation; and
two further multiplying elements, each having:
   i) a first input connected to the stored samples from the second sampler corresponding to samples at instant $t_0+nT+p$ and $t_0+(n-1)T+p$, when processing the sample from the first sampler taken at instant $t_0+nT$
   ii) a second input connected to one of each of said supplemental coefficients; and
   iii) an output connected to one of each of said supplemental summing node inputs.

18. An equalization circuit comprising:
a first signal sampler configured to obtain a reference sample of an input signal, the reference sample having a reference sample value, and to produce signal samples at instants $t_0+nT$, where $t_0$ is an initial time reference, n is an integer and T is a symbol period corresponding to the sample period; and
a second signal sampler configured to obtain a set of shifted input signal samples at a sample period of one unit interval, the samples being shifted by a delay value, the delay value being less than the sample period, the obtained samples being strongly correlated with future and past transmitted bits and being weakly correlated with future and past bit transitions, the second signal sampler being configured to produce signal samples at instants $t_0+nT+q$, where q is a constant in the range $]-T/2,T/2[$; and
a multiplier circuit configured to multiply each element of said set of samples by a filter coefficient weight to create a set of compensation values, and to generate an output as a sum of the compensation values and the reference sample value.

19. An equalization circuit comprising:
a. a first signal sampler producing a signal sample at instants $t_0+nT$, where $t_0$ is an initial time reference synchronized close to the edge of each unit interval (UI), n is an integer and T is a symbol period;
b. a second signal sampler producing a signal sample at instants $t_0+nT+T/2$;
c. a set of filter coefficients
d. means to store the samples from the first and second signal samplers
e. a first summing element having one input for each filter coefficient element and producing a timing recovery output signal
f. a first multiplying element having
   i. a first input connected to the main filter coefficient for timing recovery
   ii. a second input connected to a main sample from the first signal sampler
   iii. an output connected to one of the inputs of said first summing element for timing recovery
g. a first set of multiplying elements, each having:
   i. a first input connected to one of said filter coefficients
   ii. a second input connected to one of the stored samples from the second signal samplers, stored samples are selected according to the filter length, but ignore samples $t_0+nT+T/2$ and $t_0+(n-1)T+T/2$, when processing the sample from the first sampler taken at instant $t_0+nT$
   iii. an output connected to one of the inputs of said summing element
h. a second summing element having one input for each filter coefficient element and producing a data recovery output signal
i. a second multiplying element having
   i. a first input connected to the main filter coefficient for data recovery
   ii. a second input connected to a main sample from the second signal sampler
   iii. an output connected to one of the inputs of said second summing element for data recovery
j. a second set of multiplying elements, each having:
   i. a first input connected to one of said filter coefficients
   ii. a second input connected to one of the stored samples from the first signal samplers, stored samples are selected according to the filter length, but ignore samples $t_0+(n+1)T$ and $t_0+nT$, when processing the sample from the first sampler taken at instant $t_0+nT+T/2$
   iii. an output connected to one of the inputs of said second summing element for data recovery.

20. The circuit of claim 19 wherein:
the first and second signal samplers are implemented as analog-to-digital converters; and
the summing element, the non-transitory machine readable medium, the first and second multiplying elements and the first and second sets of multiplying elements are implemented using digital circuits.

21. The circuit of claim 19 wherein the summing element comprises two supplemental inputs, and further comprising:
two supplemental coefficients set to obtain a desired timing instant variation; and
two further multiplying elements, each having:
   i. a first input connected to the stored samples from the second sampler corresponding to samples at instant $t_0+nT+T/2$ and $t_0+(n-1)T+T/2$, when processing the sample from the first sampler taken at instant $t_0+nT$
   ii. a second input connected to one of each of said supplemental coefficients; and
   iii. an output connected to one of each of said supplemental first summing node inputs.

* * * * *